Patented Oct. 9, 1945

2,386,323

UNITED STATES PATENT OFFICE 2,386,323

METHOD FOR ACCELERATING THE ALKALINE DE-ESTERIFICATION OF PECTIN

Hans Lineweaver and Rolland M. McCready, Berkeley, Calif., assignors to the United States of America as represented by Claude R. Wickard, Secretary of Agriculture, and his successors No Drawing. Application March 13, 1944, Serial No. 526,308

8 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the alkaline de-esterification of pectin, and has among its objects the provision of a means of accelerating the rate of alkaline de-esterification of pectin at any given basic pH in order to increase the efficiency of saponification methods for preparing pectinic acids.

A further object is to facilitate the use of milder reaction conditions, particularly lower temperatures, in order to reduce undesirable degradation of the reaction products.

We have found that the rate of alkaline de-esterification of pectin is substantially accelerated if a salt that yields cations in solution is added to the solution or suspension of pectin material either before or after it is adjusted to the pH at which de-esterification is to be carried out. It will be apparent that a wide variety of the salts may be used. Common examples are sodium chloride, potassium chloride, calcium chloride, magnesium chloride, sodium sulfate, sodium acetate, ammonium acetate, and so forth. The rate of de-esterification in the presence of even low concentrations (less than 0.3 molar concentration) of monovalent cations is increased on the order of 2½ times the rate obtained when no salt is added. In the presence of a divalent cation, the rate may be as great as five times that obtained in the absence of a salt.

Our invention is illustrated by the following examples:

Example I

One liter of a 2 percent citrus pectin (10 percent $CH_3O$) solution at 20.5° C. was adjusted to pH 10.5 with 0.5 N NaOH and maintained there by continuous titration until half of the $CH_3O$ was de-esterified. The time required for 50 percent de-esterification was 80–85 minutes.

Example II

The procedure used in Example I was repeated except that 5.8 gms. of NaCl was added to the solution. The time required for 50 percent de-esterification was 40–45 minutes.

Example III

The procedure used in Example I was again repeated except that 3.7 gms. of anhydrous $CaCl_2$ was added to the solution. The time required for 50 percent de-esterification was 18–20 minutes.

Example IV

A 0.5 percent solution of citrus pectin was maintained by continuous titration with alkali at pH 9.0 and 29.5° C. in the presence of a salt as indicated below. The corresponding rates are shown in the following table.

| Salt | Concentration | Relative rate of de-esterification |
|---|---|---|
| | Mols per liter | Percent |
| None | | 100 |
| NaCl | 0.05 | 170 |
| Do | .15 | 200 |
| Do | .30 | 240 |
| Do | 2.50 | 380 |
| $CaCl_2$ | 0.017 | 160 |
| Do | .05 | 280 |
| Do | .10 | 370 |

Example V

A 2 percent solution of citrus pectin was de-esterified in 0.33 N $NH_4OH$ at 15° C. (pH 10.7 to 10.9) in the presence of a salt as indicated below. The corresponding relative rates determined by measuring the residual $CH_3O$ in the pectin at various times are shown in the following table.

| Salt | Concentration | Relative rate of de-esterification |
|---|---|---|
| | Mols per liter | Percent |
| None | | 100 |
| NaCl | 0.01 | 156 |
| Do | .05 | 192 |
| Do | .1 | 230 |
| KCl | .1 | 230 |
| $CaCl_2$ | .033 | 520 |

The examples given above show that the acceleration of the rate of de-esterification effected by the added salt is attributable to the cations, since in the presence of a divalent cation chloride at half (or less) the molar concentration, the acceleration is greater than is the case with a monovalent cation chloride. Thus it appears that the rate of acceleration is independent of the chloride ion. However, while the higher valent cations affect a greater acceleration at equal concentrations or at equal ionic strengths, special precautions may have to be taken when they are used to avoid the mechanical difficulties incident to gel formation. As shown by the examples, the influence of the salt on the rate of de-esterification tends to level off near 0.1 to 0.2 molar concentration.

Since salts composed of a variety of cations and anions cause an acceleration of the rate of alkaline de-esterification of pectin, the selection of the best salt to use in any instance will depend on the particular conditions of reaction, on considerations of economy, and on the isolation procedure to be used. If the isolation procedure involves the use of organic solvents, it may be desirable to use a salt, such as ammonium acetate, that is relatively soluble in organic solvents in order to facilitate the preparation of low ash pectin. On the other hand, where the ash content is not so important, or where ash-producing isolation procedures can be used, the use of other salts may be preferable.

The accelerating effect of a salt on the rate of de-esterification occurs throughout the range of alkaline pH values. The percent acceleration caused by the salt appears to be essentially independent of the pH. Likewise, it appears to be independent of the reaction temperature. Also, the accelerant effect occurs in any alkali which may be used for the de-esterification of pectin.

It is evident that at any given temperature and pH, a considerable saving in the time required for de-esterfication of pectin can be effected by the addition of a salt to the reaction mixture. By the addition of salt, it is also possible to carry out the de-esterification under milder conditions without increasing the reaction period, which makes it possible to use lower reaction temperatures and lower pH values efficiently, and thus minimize degradation due to changes other than demethoxylation.

This invention is not limited to any particular pectin material. Purified and unpurified pectin from citrus fruit, apples, sugar beets, carrots, pea hulls, quinces, grapes, and so forth, may all be used.

Having thus described our invention, we claim:

1. In the alkaline de-esterification of pectin materials, the step which comprises adding an ionizable salt selected from the group consisting of alkali metal, alkaline earth metal and ammonia salts to the reaction mixture.

2. In the alkaline de-esterification of pectin materials, the step which comprises supplementing the reaction mixture with an ionizable salt selected from the group consisting of alkali metal, alkaline earth metal, and ammonia salts which will yield cations in the reaction mixture.

3. In the alkaline de-esterification of pectin materials, the step which comprises supplementing the reaction mixture with an ionizable sulfate which will yield alkali metal cations in the reaction mixture.

4. In the alkaline de-esterification of pectin materials, the step which comprises supplementing the reaction mixture with an ionizable acetate which will yield ammonium cations in the reaction mixture.

5. In the alkaline de-esterification of pectin materials, the step which comprises adding an ionizable salt of an alkali metal to the reaction mixture.

6. In the alkaline de-esterification of pectin materials, the step which comprises adding an ionizable salt of an alkaline earth metal to the reaction mixture.

7. In the alkaline de-esterification of pectin materials, the step which comprises adding an ionizable ammonia salt to the reaction mixture.

8. In the alkaline de-esterification of pectin materials, the step which comprises supplementing the reaction mixture with an ionizable chloride which will yield alkaline earth metal cations in the reaction mixture.

HANS LINEWEAVER.
ROLLAND M. McCREADY.